(12) United States Patent
Blaicher et al.

(10) Patent No.: US 9,449,067 B2
(45) Date of Patent: Sep. 20, 2016

(54) CONSTRAINT PROCESSING

(75) Inventors: Chistopher Youngs Blaicher, Austin, TX (US); Kerry Charles Tenberg, Austin, TX (US); Randol Keith Bright, Austin, TX (US)

(73) Assignee: BMC Software, Inc., Houston, TX (US)

( * ) Notice: Subject to any disclaimer, the term of this patent is extended or adjusted under 35 U.S.C. 154(b) by 1218 days.

(21) Appl. No.: 13/027,131

(22) Filed: Feb. 14, 2011

(65) Prior Publication Data

US 2011/0137887 A1    Jun. 9, 2011

Related U.S. Application Data

(63) Continuation of application No. 10/871,160, filed on Jun. 18, 2004, now Pat. No. 7,930,291.

(51) Int. Cl.
*G06F 17/30*    (2006.01)

(52) U.S. Cl.
CPC ... *G06F 17/30595* (2013.01); *G06F 17/30371* (2013.01)

(58) Field of Classification Search
CPC .......................... G06F 7/24; G06F 17/30595
USPC .......................................................... 707/752
See application file for complete search history.

(56) References Cited

U.S. PATENT DOCUMENTS

| | | | |
|---|---|---|---|
| 4,933,848 A * | 6/1990 | Haderle et al. | |
| 6,427,143 B1 * | 7/2002 | Isip et al. | |
| 2004/0122828 A1 * | 6/2004 | Sidle et al. | 707/100 |
| 2004/0122868 A1 * | 6/2004 | Chan et al. | 707/200 |

* cited by examiner

*Primary Examiner* — Jason Liao
(74) *Attorney, Agent, or Firm* — Brake Hughes Bellermann LLP

(57) ABSTRACT

Constraint processing for a relational database generates primary (e.g., based on primary key values) and constraint index records (e.g., based on foreign key values) during table load operations that are then sorted in a manner that rapidly and unambiguously identifies rows that fail the specified constraint test. Rows so identified may be deleted to maintain the constraint (e.g., referential) integrity of a child table. In one case, child table row data may be processed in constraint key order, eliminating the need first load the child table with row data and then delete those rows that subsequently fail the integrity test.

18 Claims, 6 Drawing Sheets

SORTED PIX/RIX RECORDS
500

PIX(A) 505

RIX(A)-1 510

⋮

RIX(A)-M 520

PIX(B) 525

PIX(C) 530

RIX(C)-1 535

⋮

RIX(C)-N 540

⋮

PRIMARY INDEX (PIX) RECORD
300

REFERENTIAL INDEX (RIX) RECORD
400

SORTED PIX/RIX RECORDS
500

ERROR RECORD
700

CONSTRAINT PROCESSING

CROSS REFERENCE TO RELATED APPLICATIONS

This application is a continuation of, and claims priority to, U.S. patent application Ser. No. 10/871,160, entitled "Constraint Processing," filed Jun. 18, 2004 and which is hereby incorporated by reference.

BACKGROUND

The invention relates generally to computer database systems and more particularly to referential constraint processing during database load operations. The subject matter of the invention is generally related to the following jointly owned and co-pending patent application: "Cascade Delete Processing" by Christopher Y. Blaicher, Kerry C. Tenberg and Randol K. Bright (Ser. No. 12/647,823) which is incorporated herein by reference in its entirety.

Virtually all modern DataBase Management Systems ("DBMS") provide mechanisms that permit users to constrain the value of one database entity based on the value or existence of another database entity. One common constraint type is the referential constraint. Referential constraints require that a value referred to by one database entity (e.g., a row in a first table) is associated with an existing entity in the database (e.g., another row in the same or different table). In the context of the Structured Query Language ("SQL"), referential constraints are implemented through the use of Foreign Keys ("FK"), wherein a database entity's FK value must equate to the Primary Key ("PK") value of another, existing, database entity.

In general, constraint processing is preformed during database update and load operations and may be handled in accordance with one of three ways or policies. In the first, deletion of a referenced entity is prohibited. This policy often referred to as the "Reject Violating Modifications" policy. In the second, if a referenced entity is deleted or determined to be invalid then all entities that reference it are also deleted (or marked invalid). This policy is often referred to as the "Cascading" policy. In the third, FK values referencing a deleted or invalid PK value are set to NULL. This policy is often referred to as the "Set-Null" policy.

In the context of a relational DBMS, FIG. 1 shows prior art load-time referential constraint processing operation 100 as it relates to loading two related tables—the first table a "parent" table and the second table a "child" table to the first table through a referential constraint relationship. Parent table data is loaded (block 105) and the table's PK index is built or loaded (block 110). Next, child table data is loaded (block 115) and the table's FK index is built or loaded (block 120). It will be recognized by those of ordinary skill in the art that data (i.e., rows) marked for deletion but stored externally are not typically loaded during the acts of blocks 105 and 115. Accordingly, PK and FK indexes do not incorporate references to "deleted" row data. Once the tables (data and indexes) are loaded, referential constraint processing for the child table may be performed (blocks 125-145).

Constraint processing begins by obtaining a first row of the child table and identifying the row's FK as it relates to the parent table (block 125). The FK so obtained is used to probe the parent's PK index (block 130). If the parent's PK index does not have an entry corresponding to the child's FK value (the "No" prong of diamond 135), the FK fails to satisfy the referential integrity check and the child's row is marked for deletion (block 140). If the parent's PK index does not have an entry corresponding to the child's FK value (the "Yes" prong of diamond 135), the FK satisfies the referential integrity check. If child data remains to be processed in accordance with blocks 125-140 (the "No" prong of diamond 145), processing continues at block 125 where the "next" row of data from the child table is obtained. If no more child data remains to be processed (the "Yes" prong of diamond 145), the load operation is completed by removing child data rows marked for deletion in accordance with blocks 125-145 (block 150). Mathematically, the time required to perform load-time referential constraint processing in accordance with FIG. 1 can be expressed as follows:

$$T(\text{load}) = T(\text{parent}) + T(\text{child}) + [T(\text{probe}) \times N], \quad \text{EQ. 1}$$

where T(load) represents the total load time, T(parent) the time to load the parent table (data and PK index), T(child) the time to load the child table (data and FK index), T(probe) the time required to probe the parent's PK index and N represents the number of probes into the parent table's PK index required.

It will be recognized by those of ordinary skill in the art that the act of probing (block 130) can consume a significant amount of time. One reason for this is that indexes are typically implemented using B-tree structures and, more typically, B+ tree structures. For large tables, the very act of sequentially retrieving (probing) a large number of key values can become a significant portion of the total time needed to load the targeted tables. Thus, to provide improved load-time characteristics of database management systems it would be beneficial to provide techniques (methods and devices) to significantly reduce the time required to load and referentially verify database entities.

SUMMARY

Methods, devices and systems in accordance with the invention generate primary and constraint index records during database table load operations that are then sorted in a manner that rapidly and unambiguously identifies rows that fail the specified constraint testing. Rows so identified may be deleted to maintain the constraint integrity of a child table. In one embodiment, the primary index records comprise primary key index records and the constraint index records comprised foreign key index records such that the constraint test identifiers referential integrity failures.

In slightly more particularity, a primary index record is generated (or obtained if the parent table is already loaded) for each valid parent table row. Each primary index record comprises a flag element having a first value. In addition, a constraint index record is generated for each valid child table row to be loaded and similarly comprises the flag element—only having a second value. The primary and constraint index records may then be sorted (based in part on the first and second flag element values) in such a manner that each primary index record occurs immediately prior to any constraint index record(s) that are related to it (e.g., where the parent table's primary key values equals the child table's foreign key value). Child table rows that violate the constraint are identified by those constraint index records whose key value does not match the key value of an immediately prior primary index record. Constraint processing in accordance with the invention is applicable to self-referencing and multi-table constraint relationships.

One benefit of a constraint processing operation in accordance with the invention is that it can provide a substantial reduction in the time required to load one or more database tables by avoiding primary key index probe operations. In one embodiment, a child table may be processed so that rows that fail constraint verification are not even loaded, thereby avoiding the need to first load, mark and, finally, delete the offending rows.

DETAILED DESCRIPTION

Techniques (including methods and devices) to provide improved load-time referential constraint processing are described. The following embodiments of the invention, described in the context of a DB2® database system, are illustrative only and are not to be considered limiting in any respect. ("DB2" is a registered trademark of the International Business Machines Corporation of Armonk, N.Y.)

Figure 1:
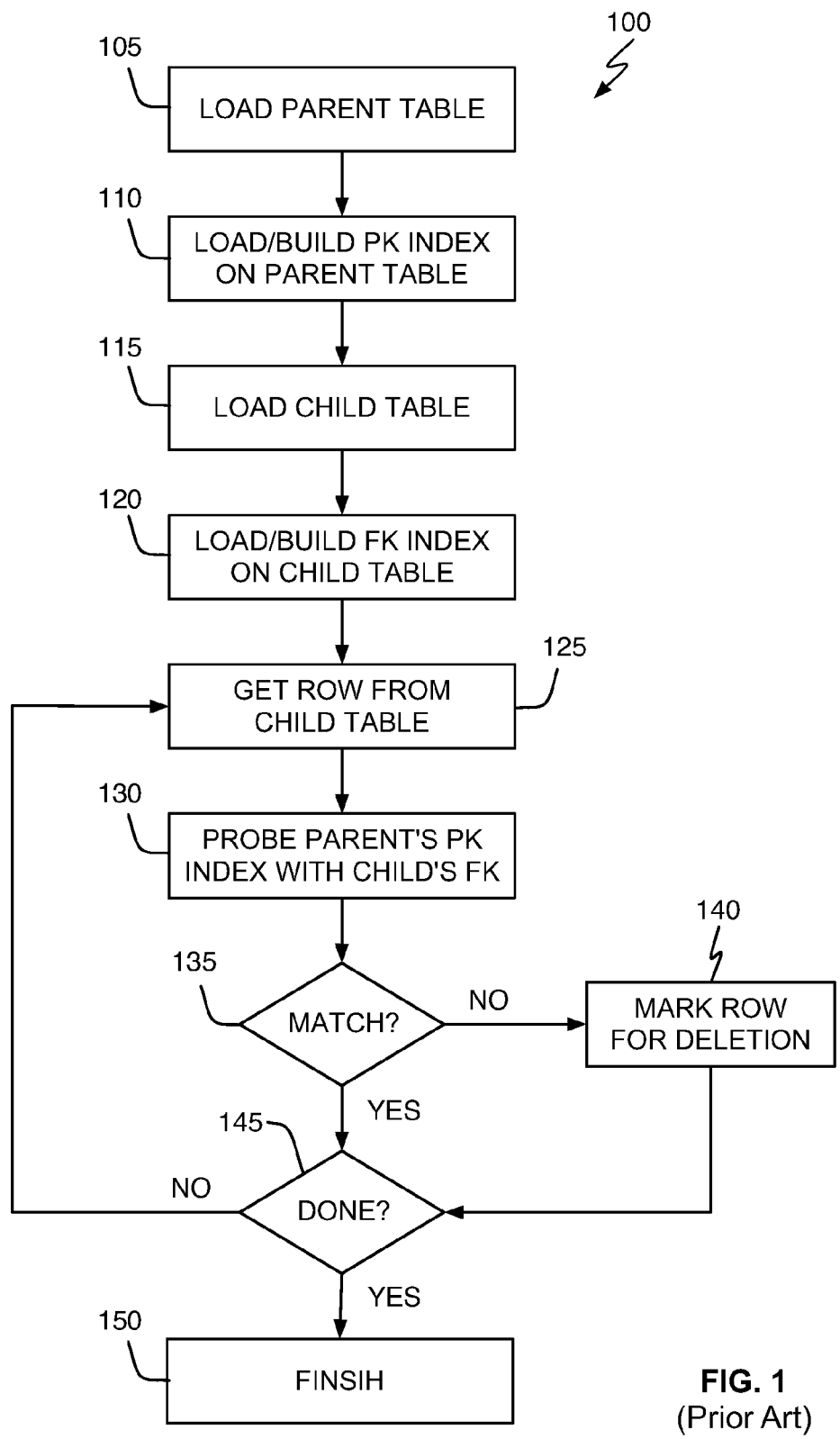
FIG. 1 shows, in flowchart format, a load-time referential constraint processing operation in accordance with the prior art.
Figure 2:
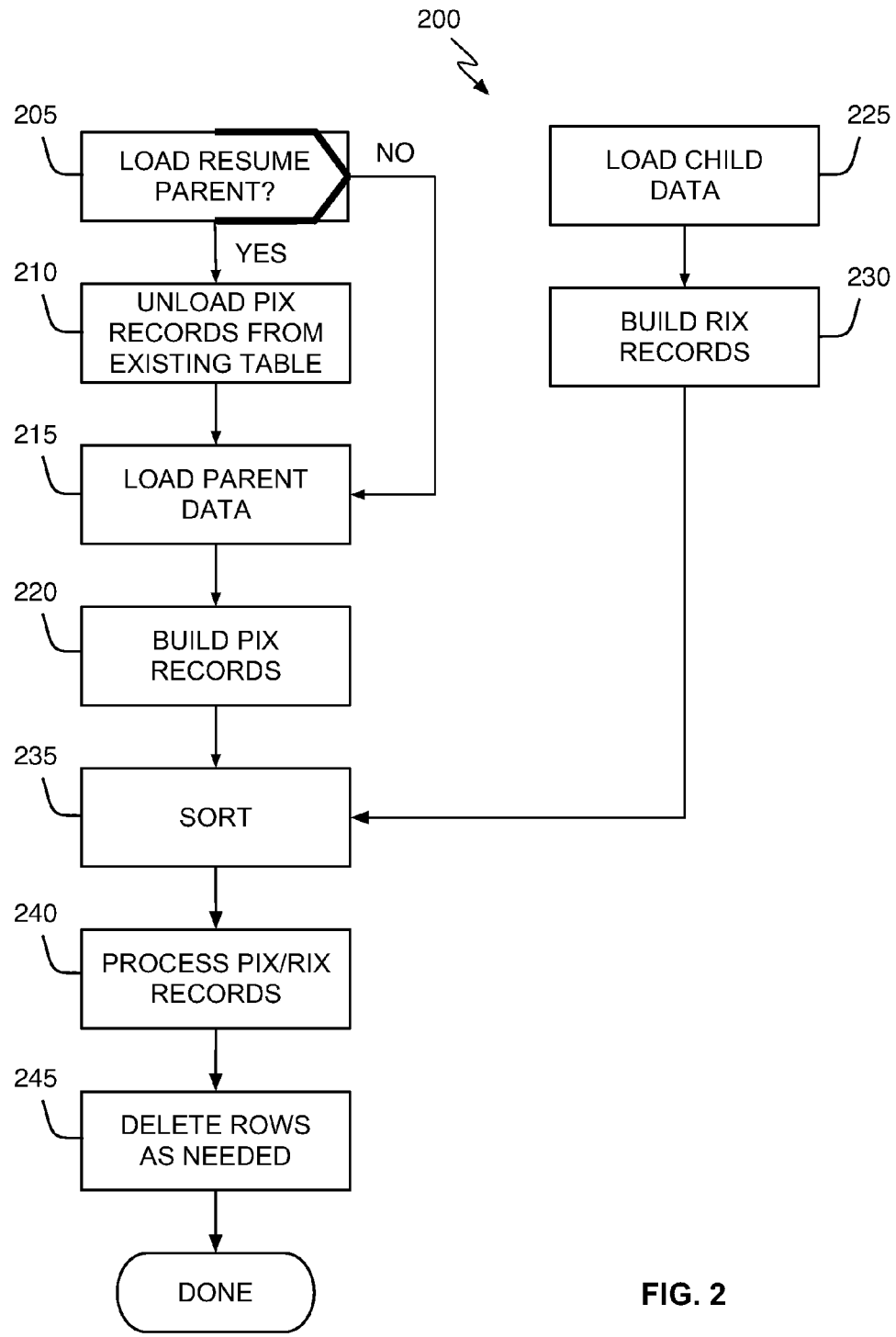
FIG. 2 shows, in flowchart format, a load-time referential constraint processing operation in accordance with one embodiment of the invention.

Referring to FIG. 2, constraint processing method 200 in accordance with one embodiment of the invention begins by determining whether the current parent table load operation is a LOAD-RESUME or LOAD-REPLACE operation. In the context of DB2 database system, a LOAD-RESUME operation is one in which new data is added to a previously loaded table. In contrast, a LOAD-REPLACE operation completely replaces a loaded table's data with new data. If the current parent-table load operation is a LOAD-RESUME operation (the "Yes" prong of block 205), primary index records for the existing data in the parent table are obtained from the parent table's primary key index (block 210). If the current parent-table load operation is a LOAD-REPLACE operation (the "No" prong of block 205), or following the acts of block 210, the parent table's data is loaded (block 215). During the data load process of block 215 and/or the acts of block 210, primary index record ("PIX") records are built (block 220).

Figure 3:
FIG. 3 shows the structure of a primary index record in accordance with one embodiment of the invention.

PIX records are based on the parent table's primary key index entries obtained during the acts of block 210 and/or generated during the acts of block 215. Referring to FIG. 3, in one embodiment PIX record 300 includes parent table identifier ("TID") field 305, primary key ("PK") field 310, flag field 315 and row identifier ("RID") field 320. TID field 305 identifies the (parent) table with which the primary key index entry is associated. Primary key field 310 contains the primary key assigned to that row in the parent table associated with the primary key index record. Flag field 315 contains a first value in accordance with the invention. And RID field 320 contains the row identifier assigned to that row in the parent table associated with the primary key index record.

Figure 4:
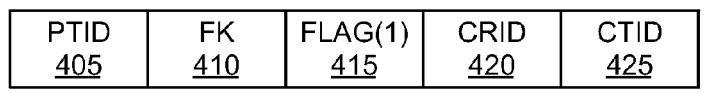
FIG. 4 shows the structure of a referential index record in accordance with the invention.

Following, or in parallel with the acts of blocks 205-220, the child table's data is loaded (block 225). The acts of block 225 are performed for any child table data being loaded—whether the load operation is a LOAD-RESUME or a LOAD-REPLACE. As each row of child table data is loaded, a corresponding referential index record ("RIX") is built (block 230). Referring to FIG. 4, in one embodiment RIX record 400 includes parent table identifier ("PTID") field 405, foreign key ("FK") field 410, flag field 415, child table row identifier ("CRID") field 420 and child table identifier ("CTID") field 425. PTID field 405 identifies the parent table with which the child table's row is related through a referential constraint. Foreign key field 410 contains the foreign key assigned to that row in the child table associated with the referential index record. Flag field 415 contains a second value in accordance with the invention. CRID field 420 contains the row identifier assigned to that row in the child table associated with the referential index record. And CTID field 425 identifies the (child) table with which the referential index entry is associated.

It will be understood by those of ordinary skill in the art that the acts of blocks 215 and 225 may, and typically do, involve data validation. If any element of a row's data fails its data validation check, an error log is generated and the row containing the element is not loaded. For example, if a table's schema defines column 'k' to be of type "date," and the data retrieved during the acts of block 215 or 225 corresponding to column 'k' fails to be formatted in an accepted date format, that data is considered invalid and the entire row is rejected—not loaded. Whenever a row's data fails this type of data validation, DBMS' typically generate or "log" an error record to a DBMS error file. Error records identify, inter alia, the table (via a table identifier), the row (via a row identifier) and the type of error that caused the data to be rejected.

PIX records generated in accordance with blocks 220 and RIX records generated in accordance with block 230 are then sorted (block 235). In one embodiment, the sort is performed on table identifier 305, primary key 310 and flag 315 fields of PIX record 300 and parent table identifier 405, foreign key 410 and flag 415 fields of RIX record 400. By selecting PIX record flag field 315 to have a value less than RIX record flag field 415, the sort can ensure that all parent and child rows that are related through a referential constraint are grouped together and that the parent table entry, for any group of referentially related rows, precedes any and all child table entries. By way of example only, in one embodiment flag fields 315 and 415 are embodied as one byte fields wherein PIX record flag field 315 is assigned a hexadecimal value of 0x00 and RIX record flag field 415 is assigned a hexadecimal value of 0x80.

Figure 5:
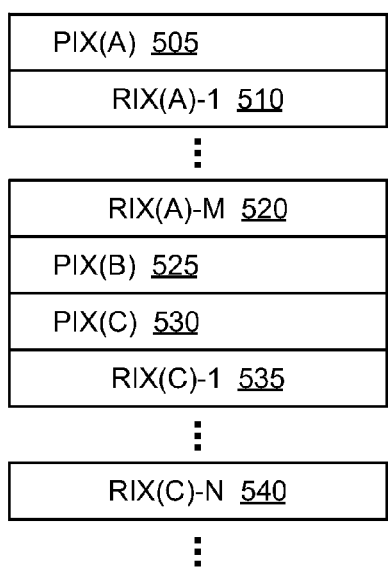
FIG. 5 shows the organization of a sorted list of primary and referential index records in accordance with one embodiment of the invention.

FIG. 5 illustrates PIX/RIX records 500 sorted in accordance with one embodiment of the invention (block 235). As illustrated, PIX record associated with parent table row A (PIX(A) 505) has M rows (RIX(A)-1 510 through RIX(A)-M 520) in one or more child tables related to it through a referential constraint. PIX record associated with parent table row B (PIX(B) 525) has no child table rows associated with it via a referential constraint (that is, there are no child table rows having a foreign key equal to parent table's row B primary key). And PIX record associated with parent table row C (PIX(C) 530) has N rows (RIX(C)-1 535 through RIX(C)-N 540) in a child table related to it through a referential constraint.

Referring again to FIG. 2, PIX and RIX records sorted in accordance with block 235 are processed to identify child table rows that violate a referential constraint (block 240). Rows so identified may be deleted to ensure that the child table exhibits referential integrity (block 245).

Figure 6:
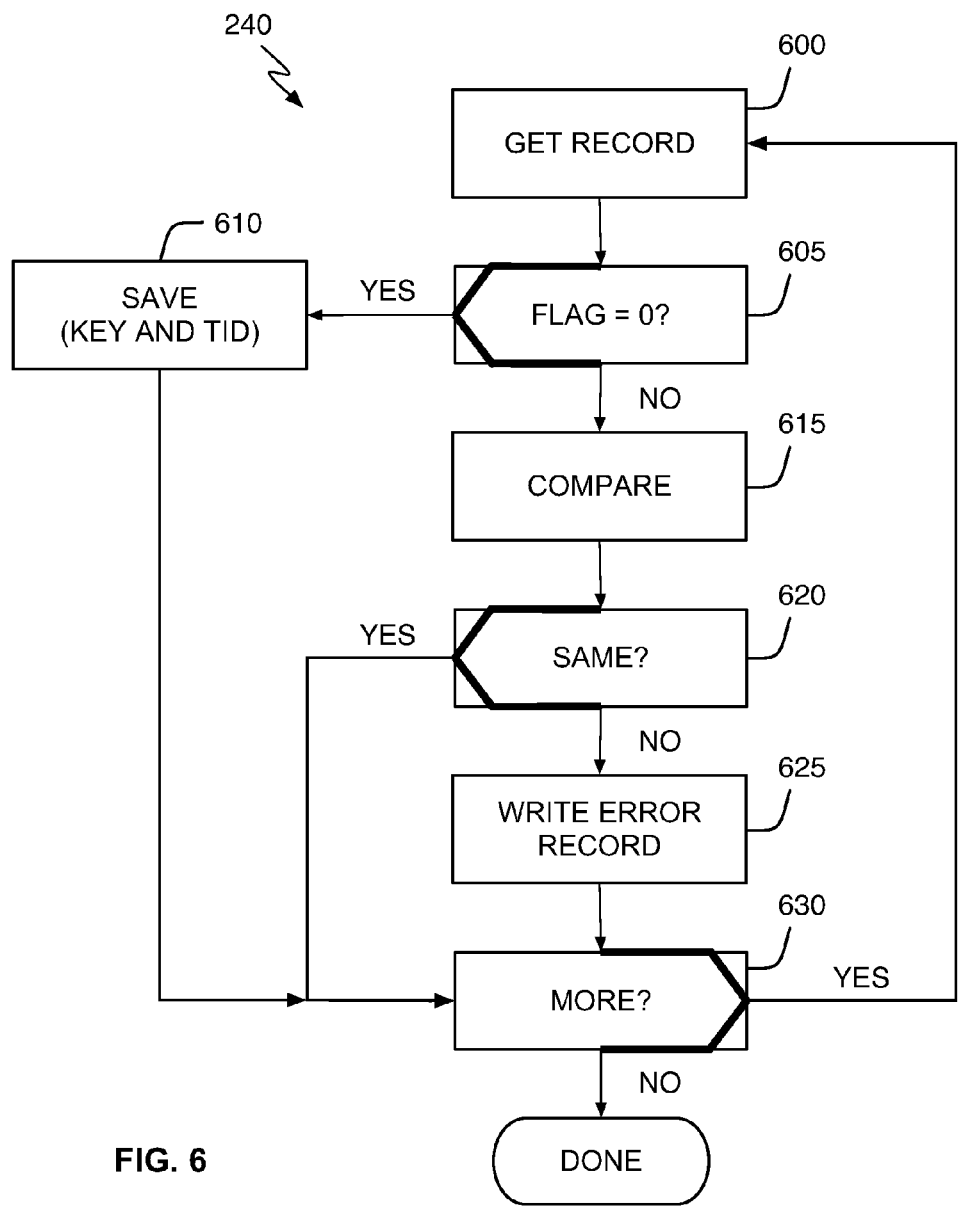
FIG. 6 shows, in flowchart format, a referential index record processing technique in accordance with one embodiment of the invention.

Referring to FIG. 6, illustrative RIX record processing in accordance with block 240 is shown. A first record is obtained from the list of sorted PIX and RIX records such as, for example, list 500 (block 600). Given the example flag values identified above, if the flag field of the obtained record is zero (the "Yes" prong of block 605), the record represents a PIX record. The primary key (field 310) and table identifier (field 305) fields from the PIX record are stored (block 610) and a check is made to see if additional sorted records remain to be processed (block 630). If the flag field of the obtained record is not zero (the "No" prong of block 605), the record represents a RIX record. The RIX record's parent table identifier (field 405) and foreign key (field 410) are compared against the most recently stored PIX record's table identifier and key values (block 615). If the PIX record's table identifier (field 305) matches the RIX record's parent table identifier (field 405) and the PIX record's primary key (field 310) matches the RIX record's foreign key (field 410) (the "Yes" prong of block 620), the child table's row associated with the RIX record does not violate a referential constraint and a check is made to see if additional sorted and records remain to be processed (block 630). If there is a mismatch at block 615 (the "no" prong of block 620), the child table row associated with the RIX record violates a referential constraint. Accordingly, an error record is written to a system error file (block 625). In many database systems, e.g., the DB2 DBMS, the system error file is a flat file.

Figure 7:
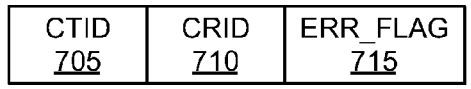
FIG. 7 shows the structure of an error record in accordance with the invention.

Referring to FIG. 7, error record 700 in accordance with one embodiment of the invention includes an identifier of the table from which the offending row comes (field 705), a row identifier within the table (field 710) and error flag (field 715) identifying the error record as a referential constraint violation error record.

Referring again to FIG. 6, once the error record is written or following the acts of blocks 610 or 620, a check is made to determine if the sorted list of PIX and RIX records contains records that have not yet been processed in accordance with FIG. 6. If no such records remain (the "No" prong of block 630), RIX record processing is complete. If at least one record remains (the "Yes" prong of block 630), processing continues at block 600.

Figure 8:
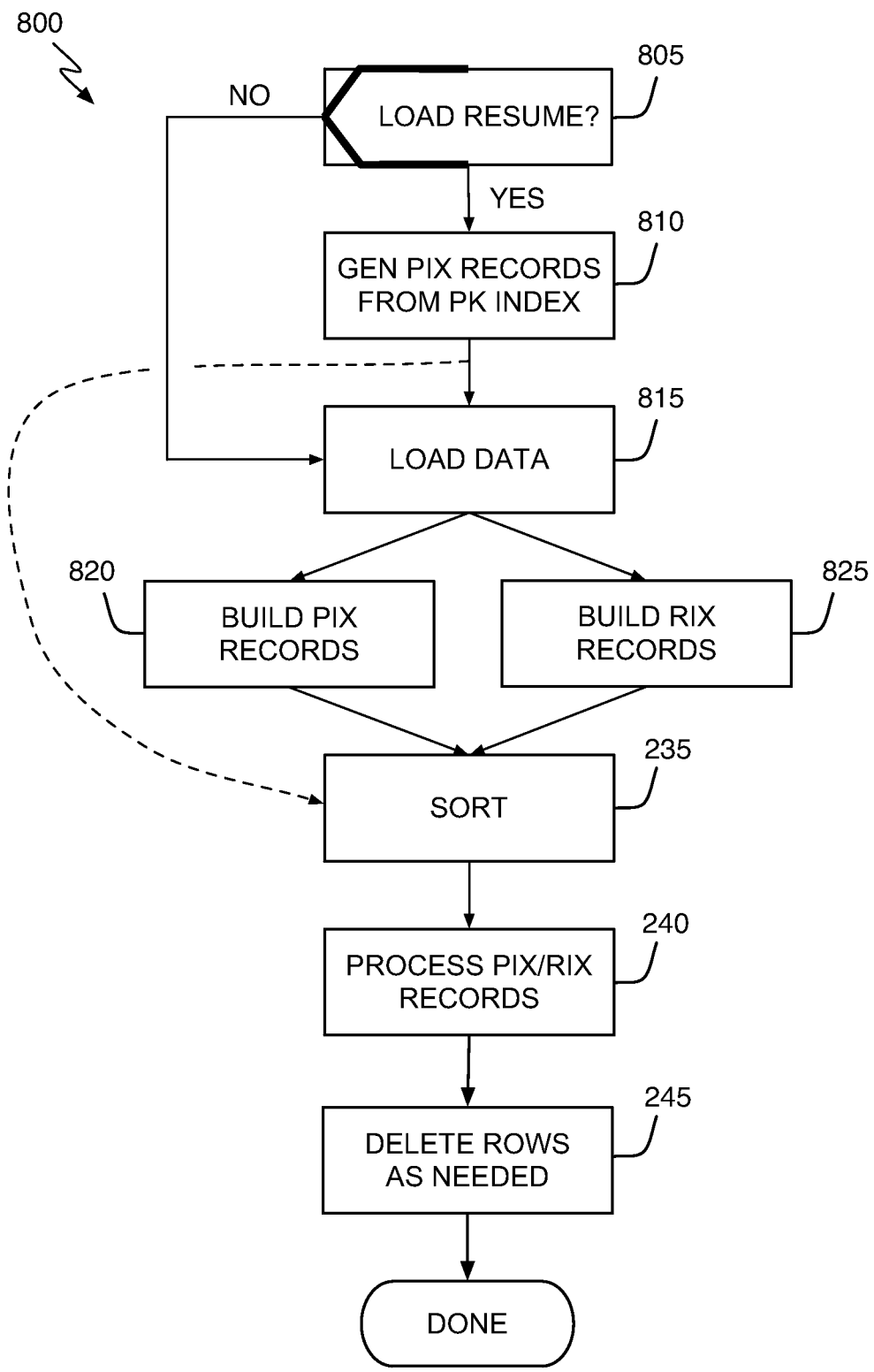
FIG. 8 shows, in flowchart format, a load-time referential constraint processing operation for a self-referencing table in accordance with the invention.

The method of FIG. 2 (and associated figures as describe above) is applicable to a single parent with one or more child tables, it is also applicable to a single self-referencing table. That is, a table that is both a parent and a child with respect to a referential constraint relationship. In this latter case, the method of FIG. 2 may be simplified as shown in FIG. 8. More particularly, constraint processing method 800 for self-referencing tables begins by determining whether the current load operation is a LOAD-RESUME or LOAD-REPLACE operation. If the current load operation is a LOAD-RESUME operation (the "Yes" prong of block 805), PIX records are generated based on the table's primary key index records (block 810). If the current load operation is a LOAD-REPLACE operation (the "No" prong of block 805), or following the acts of block 810, the table's data is loaded (block 815). During the data load process of block 815, PIX and RIX records are built for the newly loaded data (blocks 820 and 825). PIX records generated in accordance with blocks 810 and/or 820 and RIX records generated in accordance with block 825 are sorted (block 235), processed (block 240) and rows in violation of the referential constraint are deleted (block 245).

Figure 9:
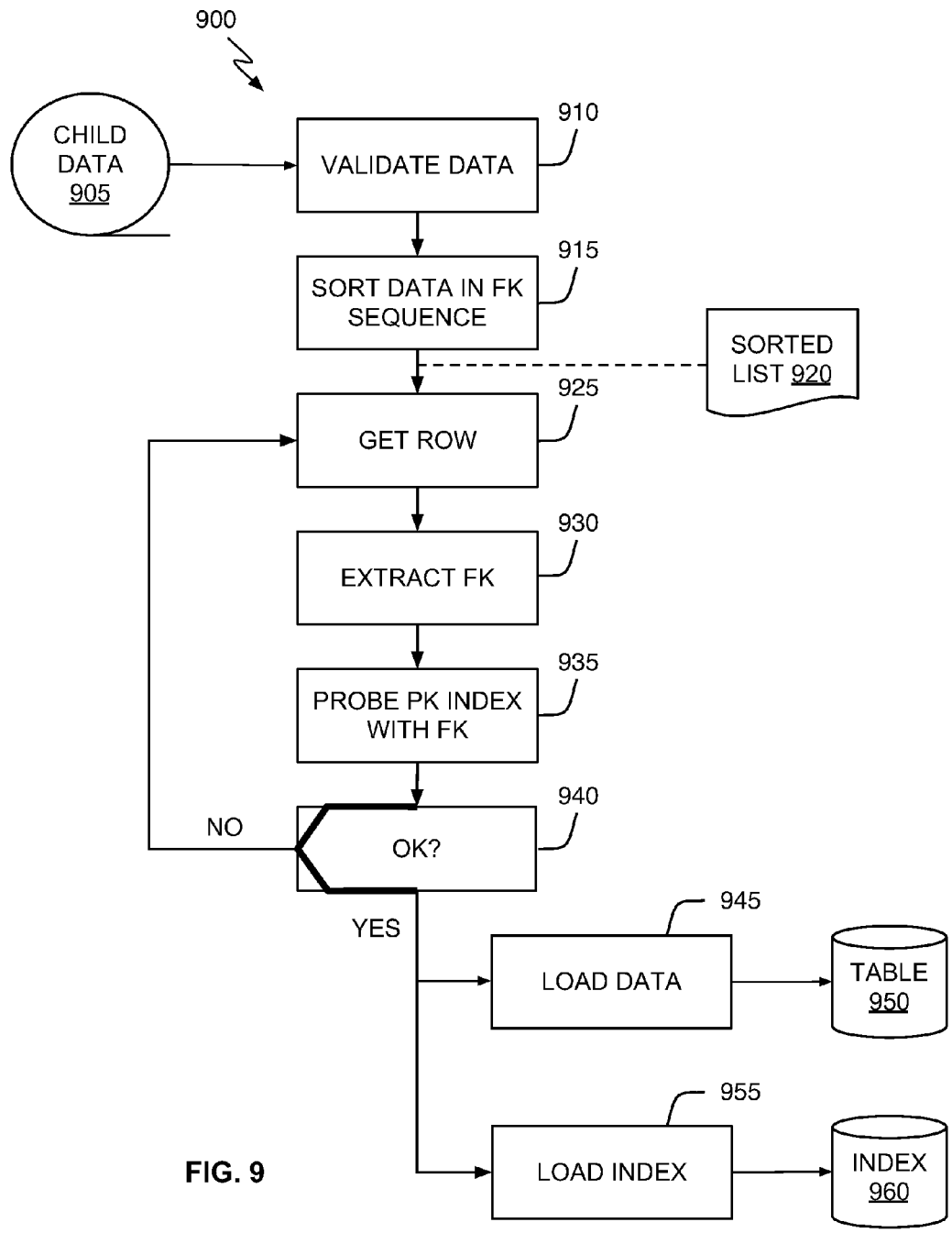
FIG. 9 shows, in flowchart format, a load-time constraint processing in accordance with another embodiment of the invention.

In a special case, where the parent table is already loaded, a child table's data may be processed in accordance with the invention in such a manner as to completely avoid the loading of data that must be later deleted because it its inclusion would violate a referential constraint. Referring to FIG. 9, method 900 in accordance with this embodiment of the invention takes child table data 905, validates it as described above (block 910) and then sorts each validated row in foreign key sequence (block 915) to generate sorted list 920. A first entry from sorted list 920 is obtained (block 925) and its foreign key is extracted (block 930). The foreign key is then used to probe the parent table's primary key index (block 935). If the foreign key corresponds to an existing primary key (the "Yes" prong of block 940), no referential constraint violation exists with respect to the current row. Accordingly, the row is loaded (block 945) into child table 950 and, if the child table's schema defines an index in which the row should participate, an index entry for the row is generated (block 955) and loaded into index 960. As noted above, one benefit of this approach is that new data is never loaded into a child table until it has been verified that the row does not violate a referential constraint. This can provide significant reduction in the amount of time required to load a child table.

Various changes in the details of the illustrated operational methods are possible without departing from the scope of the following claims. For instance, the order in which certain operations in accordance with FIGS. 2, 6, 8 and 9 are performed may be varied from those shown. By way of example only, while processing in accordance with the invention does not begin until both child and parent table are loaded, it does not matter which is loaded first. Further, for ease of discussion the description herein has been limited to a single parent table and a single child table. No such limitation exits in practice. That is, it does not matter if a parent table has more than one child table or if a child table has multiple parent tables—methods in accordance with the invention can process constraints in either of these situations. In addition, the act of sorting incoming data rows in accordance with block 915 (see FIG. 9) is not required by the invention, although it has been found to substantially speed the index probe operations of block 935.

It is noted that while the description of the preferred embodiments were limited to processing referential constraints, the techniques described herein are equally applicable to load-time processing of other types of constraints. For example, key constraints, domain constraints and general constraints may also be processing in accordance with the invention. It is further noted that in known relational database management systems, primary key index records exist and may be substantially similar in structure to a PIX record in accordance with FIG. 3. Similarly, known database management systems embody foreign key index records which may be substantially similar in structure to a RIX record in accordance with FIG. 4. Accordingly, in one embodiment standard primary key and foreign key index records are augmented to include flag fields 315 and 415. In some embodiments, such structures may include unused storage (e.g., a byte or word that is not allocated for a specific task by the DBMS). In such cases, this unused storage may be usurped for use in accordance with the invention. In those DBMS where no un-used space exists in primary key and foreign key index structures, storage (e.g., a bit, byte or word) for this purpose may be added.

Acts in accordance with FIGS. 2, 6, 8 and 9 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The preceding description has been presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

What is claimed is:

1. A method to process a constraint in a database having a table that is both a parent and a child with respect to a referential constraint relationship, comprising:
    generating a primary index record for each loaded row of data associated with a parent table, each of said primary index records including a table identifier, a primary key associated with the row of data, and a first flag value;
    generating a referential index record for each loaded row of data associated with a child table, each of said referential index records including a parent table identifier, a foreign key associated with the row of data, and a second flag value, the second flag value having a value different than the first flag value;
    sorting the primary index records and the referential index records based on the table identifier, the primary key, and the first flag value of the primary index records, and the parent table identifier, the foreign key, and the second flag value of the referential index records, wherein, by selecting the first flag value to be different than the second flag value, referential index records associated with the child table having the same foreign key are grouped together and one primary index record whose primary key corresponds to the foreign key of the referential index records immediately precedes the group of referential index records; and
    deleting those rows associated with each referential index record whose foreign key does not match the primary key of an immediately prior primary index record.

2. The method of claim 1, wherein the acts of generating a primary index record, generating a referential index record and sorting are performed during a table load operation.

3. The method of claim 2, wherein the table load operation comprises a load resume operation.

4. The method of claim 2, wherein the table load operation comprises a load replace operation.

5. The method of claim 1, wherein the first flag value is zero.

6. The method of claim 5, wherein the second flag value is greater than zero.

7. The method of claim 1, wherein the act of sorting further comprises:
    sorting the primary index records based on a combination of the primary keys and the first flag values; and
    sorting the referential index records based on a combination of the foreign keys and the second flag values, wherein
    the acts of sorting jointly sorts the primary index records and the referential index records into a sorted list.

8. The method of claim 7, wherein the act of deleting comprises:
    identifying a primary index record in the sorted list;
    identifying a next index record in the sorted list;
    marking the table row associated with the next index record for deletion if the next index record is a referential index record and the foreign key of the next index record does not match the primary key of the identified primary index record; and
    repeating the acts of identifying a next index record and marking until the next index record comprises another primary index record.

9. The method of claim 8, further comprising repeating the acts of:
    identifying a next index record;
    marking the table row associated with the next index record; and
    repeating until all entries in the sorted list have been processed.

10. The method of claim 1, wherein the first flag value of each primary index record is less than the second flag value of each referential index record.

11. A non-transitory computer-readable medium having executable instructions to cause at least one processor to:
    generate a primary index record for each loaded row of data associated with a parent table, each of said primary index records including a table identifier, a primary key associated with the row of data, and a first flag value;
    generate a referential index record for each loaded row of data associated with a child table, each of said referential index records including a parent table identifier, a foreign key associated with the row of data, and a second flag value, the second flag value having a value different than the first flag value;
    sort the primary index records and the referential index records based on the table identifier, the primary key, and the first flag value of the primary index records, and the parent table identifier, the foreign key, and the second flag value of the referential index records, wherein, by selecting the first flag value to be different than the second flag value, referential index records associated with the child table having the same foreign key are grouped together and one primary index record whose primary key corresponds to the foreign key of the referential index record precedes the group of referential index records; and
    delete those rows associated with each referential index record whose foreign key does not match the primary key of an immediately prior primary index record.

12. The non-transitory computer-readable medium of claim 11, wherein the primary index records and the referential index records are generated and sorted during a table load operation.

13. The non-transitory computer-readable medium of claim 12, wherein the table load operation comprises a load resume operation.

14. The non-transitory computer-readable medium of claim 12, wherein the table load operation comprises a load replace operation.

15. The non-transitory computer-readable medium of claim 11, wherein the executable instructions to sort include executable instructions to cause the at least one processor to:
   sort the primary index records based on a combination of the primary keys and the first flag values; and
   sort the referential index records based on a combination of the foreign keys and the second flag values,
   wherein the primary index records and the referential index records are jointed sorted into a sorted list.

16. The non-transitory computer-readable medium of claim 15, wherein the executable instructions to delete include executable instructions to cause the at least one processor to:
   identify a primary index record in the sorted list;
   identify a next index record in the sorted list;
   mark the table row associated with the next index record for deletion if the next index record is a referential index record and the foreign key of the next index record does not match the primary key of the identified primary index record; and
   repeat identifying a next index record and marking the table row until the next index record comprises another primary index record.

17. The non-transitory computer-readable medium of claim 16, further comprising:
   identify a next index record;
   mark the table row associated with the next index record; and
   repeat until all entries in the sorted list have been processed.

18. The non-transitory computer-readable medium of claim 11, wherein the first flag value of each primary index record is less than the second flag value of each referential index record.

* * * * *